United States Patent [19]
Bridgford

[11] 3,734,749
[45] May 22, 1973

[54] AUTOMATICALLY OPENING FROZEN DOUGH BOX AND BAKING PAN

[76] Inventor: Hugh H. Bridgford, 6600 Boulevard East, West New York, N.J. 07093

[22] Filed: Feb. 3, 1971

[21] Appl. No.: 112,331

[52] U.S. Cl. .................99/172, 99/171 H, 229/33, 229/36
[51] Int. Cl. ...................B65b 25/16, B65d 81/34
[58] Field of Search ...............99/171 H, 171 C, 99/172; 229/33, 36

[56] References Cited
UNITED STATES PATENTS

| | | | |
|---|---|---|---|
| 3,507,668 | 4/1970 | Bridgford | 99/172 |
| 3,346,399 | 10/1967 | Watson et al | 99/172 |
| 3,502,488 | 3/1970 | Bridgford | 99/172 |

Primary Examiner—Tim R. Miles
Assistant Examiner—William L. Mentlik
Attorney—S. Stephen Baker

[57] ABSTRACT

A frozen yeast-containing developed dough fills a box-like folded box or receptacle made of a cardboard material. The receptacle is formed with two top opposing rectangular closure panels which together form the top wall of the receptacle. Integral side bottom, and end walls are also provided. When the mass of dough is permitted to thaw and rise, it presses upwardly against the top, rectangular closure panels to separate them and to effect automatic and gradual opening of the receptacle as baking proceeds. The top rectangular closure panels are each provided with an elongated scored line designed to be preliminarily manually folded inwardly to form elongated, outer hook panels. When the dough mass rises, it also catches under the hook panels and draws the opposing rectangular closure panels inwardly together at the same time as the closure panels are pressed upwardly. This inward drawing constituted a force which off-sets the tendency of the expanding mass of dough to force the receptacle side walls outwardly. As a result, numerous advantages accrue. For example, a lighter weight of cardboard material may be employed, both for economy and for providing a better shaped and more quickly baked loaf. Further, the inward drawing together of the receptacle side walls prevents those side walls from bowing outwardly and imparting an undesirable corresponding bow shape to the loaf side walls.

5 Claims, 7 Drawing Figures

Patented May 22, 1973 3,734,749

INVENTOR.
HUGH H. BRIDGFORD
BY
ATTORNEY

Patented May 22, 1973
3,734,749
2 Sheets-Sheet 2
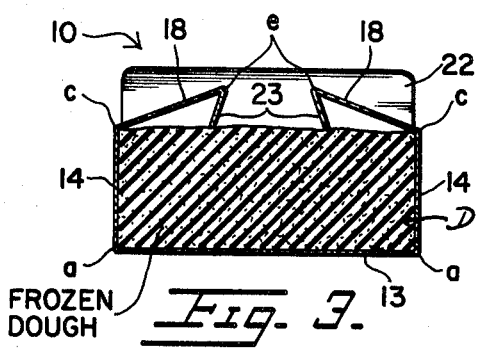
FROZEN DOUGH Fig. 3.
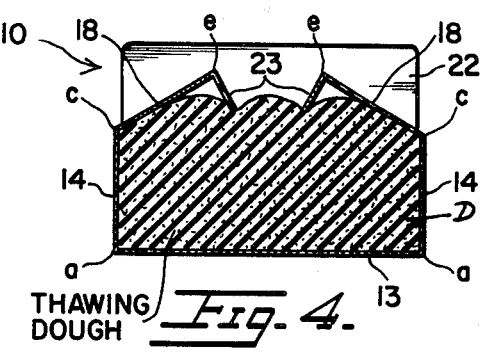
THAWING DOUGH Fig. 4.
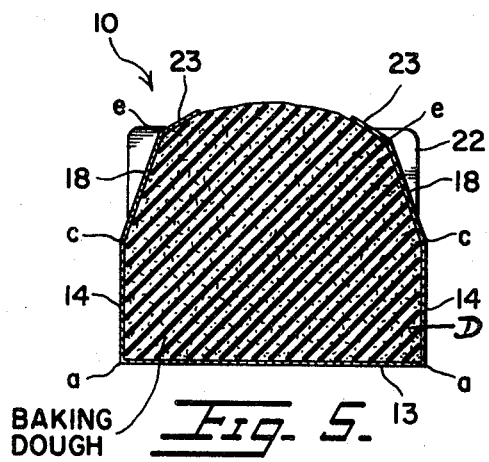
BAKING DOUGH Fig. 5.
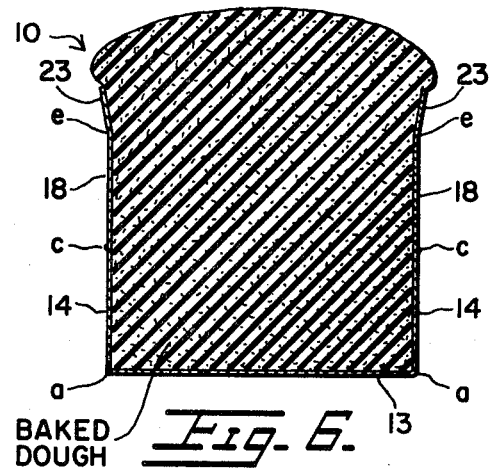
BAKED DOUGH Fig. 6.
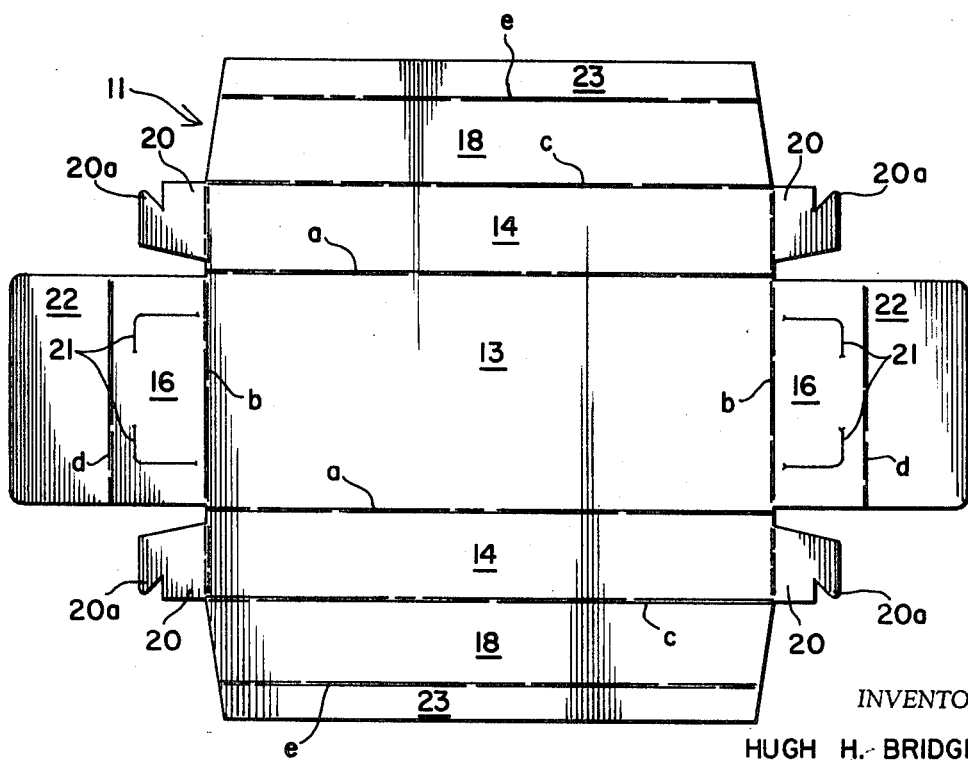
Fig. 7.
INVENTOR.
HUGH H. BRIDGFORD
BY
S. Stephen Barker
ATTORNEY

AUTOMATICALLY OPENING FROZEN DOUGH BOX AND BAKING PAN

BACKGROUND OF THE INVENTION

The present invention relates generally to an improved rectangular box for the production of baked products such as freshly baked bread and it relates particularly to an improved cardboard receptacle wherein frozen dough is stored, and wherein it may be permitted to thaw and to rise under the combined influence of a warmer environment and of ensuing yeast action in the prepared dough, and further wherein it may be baked so that the receptacle serves the dough from its frozen storage state, to its eventual baking, all without removing the dough from the receptacle until it is ready to be cooled, or to be eaten.

Obviously, during thawing and baking, the rising and expanding baking dough increases the mass of the dough so that the receptacle is correspondingly expanded and varied. Such variation in the shape of the receptacle is necessarily transmitted to the shape of the baked loaf. Most often this is of disadvantage since the receptacle tends to bulge and the loaf ends up with outwardly bowed, unaesthetic appearing sides. Other disadvantages also result as for example the texture of the bowed sides. Further, in order to avoid the above disadvantages, the art has in the past been compelled to resort to heavier cardboard material so as to resist excessive side distortion. This has of course increased the expense of the receptacle.

This invention provides a solution to the above disadvantages by further employing the motive force of the rising and expanding dough to effectively grasp and restrain the receptacle panels so as to discourage the outward bowing of the sides as above described.

The invention set forth herein is an improvement upon my prior U.S. Pat. Nos. 3,502,488 issued Mar. 24th, 1970, and 3,507,668, issued Apr. 21, 1970.

SUMMARY OF THE INVENTION

It is a principal object of the present invention to provide an improved storage and baking receptacle of the nature above described. Basically a more compact, lighter weight cardboard material is made possible, while a better shaped final loaf is achieved, among other advantages. This is effected by inwardly folding longitudinal edge sections of the receptacle top closure panels before the dough is permitted to thaw and to rise. These edge sections thus provide opposite narrow panels which serve as hooks. The rising dough not only pushes upwardly on the underside of the top panels to automatically open the receptacle during baking of the dough, but the hooked panels are caught or snagged by the mass of rising dough with the result that the top panels are also drawn inwardly by the force of the rising dough. This force is transmitted to the receptacle side walls so as to correspondingly draw them inwardly, thus off-setting their tendency to bow outwardly in response to the expanding force of the rising dough. The result of this action is to improve the shape as well as the texture of the finished loaf.

Another object of this invention is to conserve expense by employing a lighter weight of cardboard material than heretofore made necessary. This results from the fact that a heavier gauge of board was heretofore required to minimize side wall bowing, whereas this invention employs the force of the expanding dough to pull upon and in effect fortify the side walls.

The above and other objects of this invention will become apparent from the following description and drawings.

BRIEF DESCRIPTION OF THE DRAWINGS

FIG. 3 is a cross-sectional view as taken along the line 3—3 of FIG. 2;

FIG. 4 is a cross-sectional view similar to FIG. 3 but showing the intermediate thawing and rising of the dough and its co-action with the folded hook-like panels;

FIG. 5 is a further cross-sectional view showing the dough further rising while still being somewhat engaged by the hook-like panels which are however now being spread out and resting against the top edges of the dough. This is the baking condition;

FIG. 6 is the final cross-sectional view with the loaf completely baked;

FIG. 7 is a plan view of the lay flat blank which is used to form the receptacle, the inside thereof being shown.

DESCRIPTION OF THE PREFERRED EMBODIMENT

Figure 1:
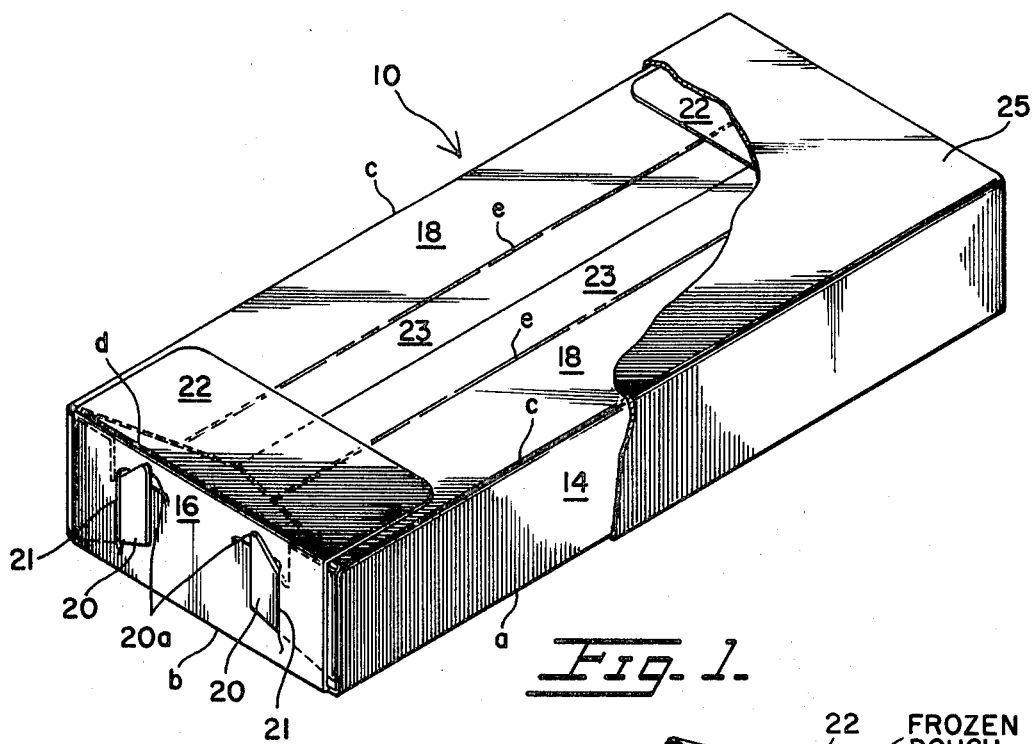
FIG. 1 is a perspective view of the fully closed dough receptacle of this invention, the dough being frozen and accordingly compacted and the outer removable wrapper of the receptacle being partly broken away.

Referring now to the drawings which illustrate a preferred embodiment, the reference numeral 10 generally designates the improved storage carton and baking receptacle which is formed from the unitary blank 11 shown in FIG. 7. Blank 11 consists of a cardboard structure preferably coated along its entire inner surface with a layer of aluminum foil or the like to discourage sticking of the dough to such inner surface. The outer surface may be coated decorously as desired and conventional. The cardboard material may be of the conventional solid, bleached sulphate type having a weight of about 150 pounds per ream while the aluminum foil layer has a thickness of about 0.0003 inches and a weight of about 12½ pounds per ream. Of course, these figures are simply representative.

Referring to FIG. 7, the blank 11 comprises the rectangular bottom wall panel 13, along the long edges of which extend integral side panels or walls 14, while along the short edges of which extend integral end panels or walls 16. Side walls 14 are delineated by scored, fold lines $a$ while end walls 16 are delineated by scored, fold lines $b$. Extending from the outer edges of walls 14, and delineated therefrom by scored, fold lines $c$, are opposite, rectangular closure panels 18, each having a width about one-half that of bottom panel 13. Walls 14 are provided with hooked end tabs 20, and end walls 16 are formed with substantially L-shaped cuts 21 adapted to receive the hooks 20a of tabs 20 as will be hereinafter described. It is only necessary to fold the panels or walls as above described, and to insert the hooks 20a into the cuts 21 to form the carton or receptacle from the blank 11. By doing so, side walls 14 and end walls 16 become vertical, forming a box-like structure.

Extending from end walls 16, and delineated therefrom by scored, fold lines *d*, are rectangular top panels or end flaps 22 which overlie the outside of closure panels 18 in the formed carton or receptacle as will be hereinafter explained.

A most important aspect of this invention is the formation of the top closure panels 18. These are formed or provided with longitudinal outer strip sections 23 delineated from the main width of panel 18 by scored, fold lines *e*. Strip sections 23 are about one-third of the total width of each closure panel 18. As will be hereinafter described, strip sections 23 are adapted to be folded along lines *e* so as to form hook-like, narrow, elongated edge panels positioned so as to be grasped and pulled by the expansion of the thawing and rising dough at the same time that top closure panels 18 are pressed upwardly by the force of the expanding dough. By virtue of this action, side walls 14 are drawn inwardly, thus fortifying the receptacle against side wall bowing distortion such as would cause the finished loaf to have undesirable and unappealing bowed or outwardly inclined sides.

In initially assembling the receptacle and realizing the advantages of this invention, the formed receptacle 10 is filled to about the upper edges of panels or walls 14 and 16 with a developed yeast dough in an unraised condition, that is in which the gluten in the dough has been developed to its optimum viable state by kneading in the known manner. The yeast-containing dough may be of any conventional composition and prepared in any suitable manner, either by batch or continuous process. It may be a bread dough or a cake dough and may include any of the usual ingredients and additives. The dough may be singly kneaded or may be successively kneaded with intervening rising periods but it is packaged in the receptacle 10 in its developed, unraised state.

The receptacle 10 is then closed by folding the panels or walls 18 to a horizontal position where they enclose the mass of dough, while the end flaps 22 are swung and folded over the outside of panels 18 as shown in FIG. 1. End flaps 22 extend over about one-sixth of panels 18 on each end thereof and may be locked if desired to the outside of panels 18 which may be slitted to receive and thereby engage end flaps 22 so as to facilitate overwrapping the closed package, which is the next and final step in the assembly.

The dough-containing closed package is promptly enclosed and overwrapped by any suitable outer wrapper 25, either a transparent or printed paper wrapper for example, and is deep frozen. The article is then storaged at conventional deep freeze temperatures which maintain deactivation of the yeast and prevents any deterioration of the dough.

Figure 2:
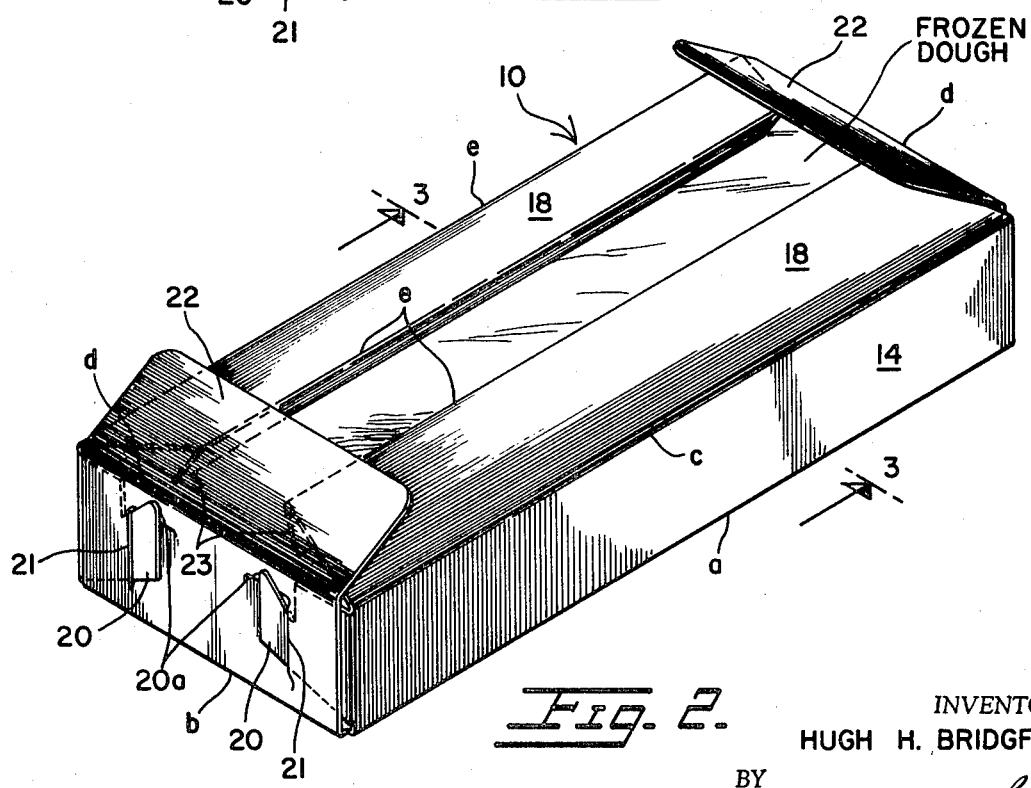
FIG. 2 is a perspective view of the receptacle with the outer wrapper removed and discarded, and the outer panel sections or flaps of the top closure panels being shown folded inwardly, the receptacle then being ready to permit thawing and rising of the dough preparatory to baking thereof in the receptacle.

In preparing to bake the dough product, the outer wrapper 25 is removed, end flaps 22 lifted somewhat to provide full access to top closure panels 18, and such panels 18 also lifted to permit outer strip sections 23 to be folded inwardly along scored lines *e* to form hook-like, narrow, elongated edge panels as illustrated in FIG. 2. At this time the frozen dough containing receptacle is placed in an area of room temperature, or at a higher temperature to expedite the action if desired. If employing such higher temperature the package may be deposited, for example, in a 150° F. oven for about 2 hours, under which conditions the yeast activity is almost maximum. If employing room temperature, the action will be slower. Thus, if the dough is permitted to thaw and rise in a somewhat warm room, the dough will thaw and rise in a period of from 4 to 7 hours or until it is about 1 inch above the side walls 14.

It is the presence of hook-like, elongated strip panels 23 which is the basis of this invention. Thus, as the dough thaws, it rises or expands in any available direction. As it rises, it presses upwardly against top closure panels 18 so as to lift said panels upwardly at an angle as illustrated in FIG. 4. At the same time, the dough would tend to push side walls 14 outwardly so as to bow them and produce a correspondingly bowed loaf. However, the action of the hook-like panels 23 prevent this. During thawing time the dough, as it expands, catches under the panels 23 where it is snagged as shown in FIG. 4. As the dough continues to expand, it grasps or engages and pulls the panels 23 inwardly toward each other. Thus the motive forces of the expanding dough are employed to off-set or neutralize the tendency of the side walls 14 to bow outwardly and the dough has a most desirable uniform rising action. The receptacle is caused by the action of panels 23 to be effectively strengthened or fortified against distortion somewhat as if the receptacle were to be fabricated of sturdy metal rather than of relatively softer cardboard. In any event, the cardboard may be of lighter weight than if such forces were not employed to prevent distortion of the package. Of course, expenses of the receptacle are thereby reduced and in fact, a better product is achieved in that the texture of the baked bread is improved by thus confining its expansion during baking.

When the dough D has risen to the desired volume or height as shown in FIG. 5, the panels 23 are spread somewhat and they rest at the angle shown against the top longitudinal edges of the dough D. At this time, the thawed dough containing receptacle 10, which now functions as a baking pan, is placed in an oven and the dough is then baked under conventional conditions, as, for example, for about 25 minutes at 375° F., such conditions being suitable for a 1 pound loaf, other weights or sizes requiring different baking times or conditions as will be evident to those skilled in the art.

FIG. 6 illustrates the completely baked loaf which may be considered to be "perfectly" shaped, the restrictive action of the panels 23 having accomplished this result. The baked loaf is of course removed from the receptacle, cooled, and eaten.

I have shown a preferred embodiment of the invention but it is obvious that numerous changes and omissions may be made without departing from its spirit.

What is claimed is:

1. A baking product preparation and storage article comprising a baking receptacle including a vertical peripheral wall, closure means movable between a position overlying and closing the top of the receptacle, and an open position projecting substantially upwardly of said peripheral wall, and a frozen, yeast-containing, unraised, developed dough in said receptacle when in closed position, said closure means comprising a pair of elongated top panels each hinged to respectively opposite sides of said peripheral wall and each having substantially centrally disposed free edges which are contiguous to each other prior to opening of said receptacle, and integral longitudinal edge sections on each of said top panels and adapted to be folded inwardly prior to baking of said dough within said receptacle so as to form hook-like, narrow, elongated edge panels positioned so as to be grasped and pulled by the expansion of the thawing and rising dough at the same time that said top panels are pressed upwardly by the expanding dough, whereby side sections of said peripheral wall are drawn inwardly against the action of the sides of the expanding mass of dough.

2. The article of claim 1 and wherein said elongated edge panels are hingedly connected to the remainder of said top panels by a scored line, said contiguous free edges being the free edges of said elongated edge panels.

3. The article of claim 2 and wherein the width of said elongated edge panels is substantially one-half of the width of said remainder of said top panels.

4. The article of claim 3 and wherein said peripheral wall side sections are directly and hingedly connected to said top panels by a scored line whereby said inwardly drawing force is transmitted to said side sections for pulling them inwardly.

5. A baking product preparation comprising a baking receptacle including a vertical peripheral wall, closure means overlying the top of the receptacle, and a frozen, yeast-containing, unraised, developed dough in said receptacle, said closure means comprising a pair of elongated top panels each hinged to recpectively opposite sides of said peripheral wall and having free edges disposed substantially centrally of the receptacle top, and hinged integral longitudinal edge sections on each of said top panels and extending inwardly and downwardly from the remainder of said top panels so as to form hook-like narrow, elongated edge panels positioned so as to be grasped and pulled by the expansion of the thawing and rising dough at the same time that said top panels are pressed upwardly by the expanding dough, whereby side sections of said peripheral wall are drawn inwardly against the action of the sides of the expanding mass of dough.

* * * * *